(12) United States Patent
Lisec

(10) Patent No.: US 6,434,974 B1
(45) Date of Patent: Aug. 20, 2002

(54) DEVICE FOR DIVIDING LAMINATED GLASS

(76) Inventor: Peter Lisec, Bahnhofstr. 34, A-3363 Amstetten-Hausmening (AT)

( * ) Notice: Subject to any disclaimer, the term of this patent is extended or adjusted under 35 U.S.C. 154(b) by 0 days.

(21) Appl. No.: 09/546,211

(22) Filed: Apr. 10, 2000

(30) Foreign Application Priority Data

Apr. 13, 1999 (AT) ................................................ 650/99

(51) Int. Cl.⁷ .......................................... C03B 33/033
(52) U.S. Cl. ........................................ 65/174; 225/104
(58) Field of Search ............................ 65/174; 83/879, 83/863; 225/2, 93.5, 96.5, 104, 105

(56) References Cited

U.S. PATENT DOCUMENTS

| 4,471,895 A | | 9/1984 | Lisec, Jr. ..................... 225/2 |
| 4,558,622 A | * | 12/1985 | Tausheck ..................... 225/96.5 |
| 4,948,025 A | * | 8/1990 | Lisec ........................... 225/104 |
| 4,988,027 A | * | 1/1991 | Bremner ....................... 225/2 |
| 5,475,196 A | * | 12/1995 | Lisec ........................... 219/121.39 |
| 5,704,959 A | | 1/1998 | Lisec ........................... 65/174 |
| 5,944,244 A | * | 8/1999 | Lisec ........................... 225/103 |

FOREIGN PATENT DOCUMENTS

| AT | 391 858 | | 12/1990 |
| DE | 26 57 757 | | 6/1978 |
| DE | 42 34 536 A1 | * | 4/1994 |
| GB | 2 235 190 A | * | 2/1991 |
| JP | 62-197329 | | 2/1988 |
| JP | 62-197329 | * | 9/1997 |

* cited by examiner

*Primary Examiner*—Sean Vincent
(74) *Attorney, Agent, or Firm*—Young & Thompson

(57) ABSTRACT

A device for dividing laminated glass (3) has two supports for laminated glass (3) which has been scratched (13, 14) on both sides and in a gap (4) between them two beams (5) which are made as suction beams. The beams (5) can be swivelled using drives (8) around horizontal axes (6) which are parallel to the dividing line such that the laminated glass (3) is arched on the one hand up and then down. By the swivelling of the beams (5) and the associated arching of the laminated glass pane (3) the fractures in the two glass panes (9, 10) are opened along the scratch lines (13, 14) which were produced beforehand, the scratch line (13) or (14) which lies on the convex side of the arched laminated glass pane (3) being opened. To separate the plastic film (15) between the glass panes (9, 10) of the laminated glass (3) a thermal radiation source (11) is used which extends preferably over the entire width of the device and which delivers thermal radiation (12) which is preferably absorbed by the plastic film (15), but not by the glass panes (9, 10) so that the latter are not significantly heated when the plastic film melts.

7 Claims, 2 Drawing Sheets

DEVICE FOR DIVIDING LAMINATED GLASS

Figure 1:
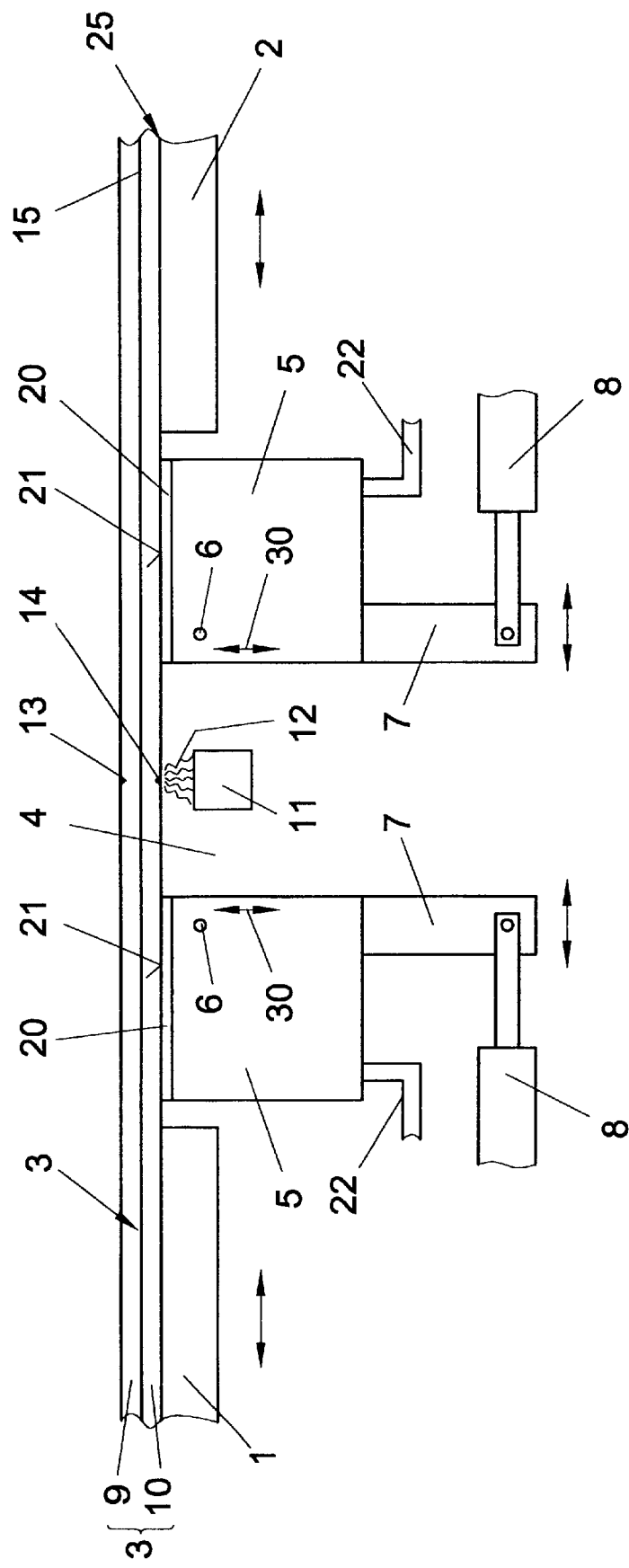

The invention relates to a device for dividing laminated glass with the features of the introductory part of claim 1.

Devices for dividing laminated glass are known for example from U.S. Pat. No. 4,471,895 or U.S. Pat. No. 5,704,959.

In the known devices for dividing laminated glass, the latter is scratched on both sides along the intended dividing line and then bent first to the one and then to the other side (arched) or buckled in order to open the break along the scratch lines. This bending or buckling takes place in the known devices by pressure strips or pressure rollers or by one of the support surfaces on which the laminated glass to be divided rests being swivelled relative to the other support surface around an axis which is aligned parallel to the scratch line (U.S. Pat. No. 5,704,959).

Since the support surfaces must be so large that the laminated glass is supported over its entire surface, the means for swivelling one part of the support surfaces represent a major mechanical effort.

The object of the invention is to devise a device of the initially mentioned type with which the laminated glass which has been scratched on both sides can be broken with less effort.

This object is achieved as claimed in the invention by the features named in claim 1.

Preferred and advantageous embodiments of the device as claimed in the invention are the subject matter of the dependent claims.

In the device as claimed in the invention it is no longer necessary to swivel one of the two support surfaces relative to the other support surface in order to open the break in the glass panes of the laminated glass (by buckling it), but the two beams are simply swivelled such that on the one hand the laminated glass is convexly arched in one and then the other direction so that the fracture which lies on the side of the laminated glass which is convex at the time opens along the scratch line which was produced beforehand. In doing so the support surfaces and the areas of the laminated glass which lie on them remain stationary, i.e. the beams move independently of the support surfaces.

In one preferred embodiment of the device as claimed in the invention the beams are made as suction beams so that the laminated glass is held securely on the beams by negative pressure. Thus the clamping beams which are necessary in the known devices and which are pressed with great force from overhead against the laminated glass are unnecessary.

In principle, it is sufficient for the device as claimed in the invention if it is equipped with two swivelling beams when the already scratched laminated glass is conveyed onto the device. But it is also possible to equip the device as claimed in the invention with means for scratching the two panes of the laminated glass.

In the same way the device as claimed in the invention can have a means with which plastic film which is held between the two panes of laminated glass can be severed after breaking along the dividing line. These devices can be made as in the prior art. It is especially preferred within the framework of the invention if the plastic film is melted by the action of heat (heat radiation) after the fracture has been opened. The film can be cut within the framework of the invention also using a blade which travels along the fracture which has then been opened and cuts through the film.

It is especially preferred that heat radiation be used with a wavelength which is absorbed to an intensified degree only by the plastic film, but not by the two glass panes so that only the plastic film, but not the two glass panes, heats up when the plastic film is melted.

Other details, features and advantages of the device as claimed in the invention result from the following description of the embodiment shown for the most part in schematic form in the drawings.

Figure 2:
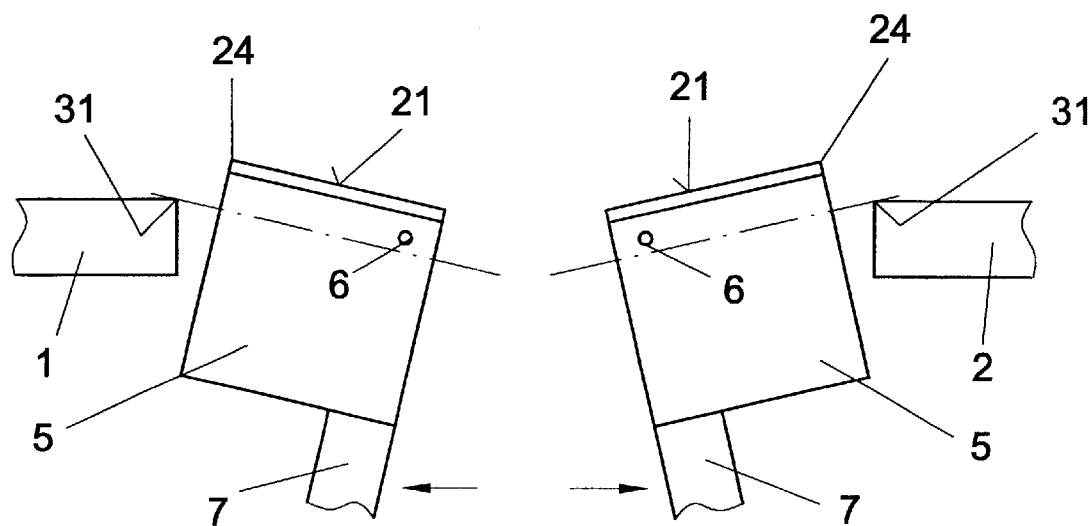
Figure 3:
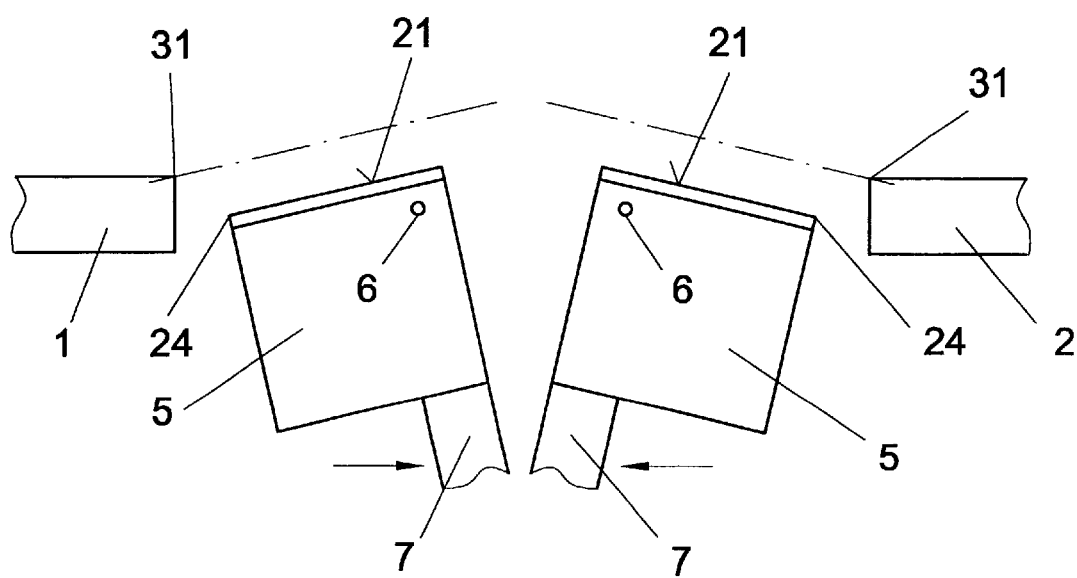

FIG. 1 shows in a side view a device as claimed in the invention (partially) and FIGS. 2 and 3 show the swivel positions of the beams when one and the other pane of laminated glass is broken.

A device shown in FIG. 1 has support plates 1 and 2 which are mounted in a machine frame and on which a laminated glass pane 3 rests. In a gap 4 between the support plates 1, 2 there are two beams 5 which can be swivelled around axes 6 which run perpendicular to the plane of the figure. To do this, the beams 5 are connected to levers 7 which are engaged by hydraulic motors 8.

Between the two beams 5 there can be means for scratching the two panes 9, 10 of the laminated glass pane 3. These means are not shown in the drawings. Furthermore, in the area 4 between the beams 5 there can be a means for cutting through the plastic film in the area of an existing break in the laminated glass, for example, a blade which can move between the beams 5 or a means 11 for delivering thermal radiation 12, this means 11 delivering thermal radiation 12 with a wavelength which is not absorbed by the glass 9, 10 of the laminated glass pane 3 at all or only little, but which is strongly absorbed by the plastic film 15 between the two glass panes 9, 10 of the laminated glass pane 3.

The beams 5 are provided on their top with supports 20 of elastic material in which there are openings which are open towards the support surface 21 of the beams 5 and which can be supplied with negative pressure. To do this, on the beams 5 there are lines 22 for connection to a negative pressure source.

The tops of the two support plates 1, 2 are, as known in the prior art, equipped with a felt support 25 and can be supplied with compressed gas (preferably compressed air) which emerges through openings in the support surface of the plates 1, 2, which surface faces the laminated glass pane 3 so that for delivery and alignment of a laminated glass pane 3 to divide (break) the latter the support plates 1, 2 act as air cushion tables. To support fixing of the laminated glass 3 during breaking, the openings which are provided in the top of the support plates 1, 2 and from which compressed gas emerges when they are acting as air cushion tables can be supplied with negative pressure so that the laminated glass pane 3 is sucked against the plates 1, 2.

Because the beams 5 are made as suction beams, for which in the top end surfaces 21 of the supports 20 there can be ribs which cross one another and in each on the ribs which cross one another there can be an opening for the negative pressure to take effect, hold-down beams which press the laminated glass pane 3 against the beams 5 and which act from overhead on the laminated glass pane 3 in the area of the beams 5 are not necessary.

To divide laminated glass along scratch lines 13, 14 which are produced beforehand in it (in the same device or in an upstream scratching device) the beams 5 are swivelled as shown in FIG. 2 and then as shown in FIG. 3. (It goes without saying that the beams 5 can be swivelled first as shown in FIG. 3 and then as shown in FIG. 2). By swivelling the beams 5 the laminated glass pane 3 arches in the area between the beams 5 so that the fracture opens in the scratch line 13, 14 which lies on the side of the laminated glass plane which is convex at the time.

It should be noted that swivelling of the two beams is shown exaggerated in FIGS. 2 and 3. Generally a small swivel movement of the beams 5 around their axes 6 is enough to cause the fracture. This is easily possible since the supports 20 of the beams 5 and the felt supports 25 of the support plates 1, 2 can be elastically deformed so that the arching of the laminated glass pane 3 to oneside and then the other is easily possible to the extent that the fracture opens along the scratch line 13 or the scratch line 14.

If a laminated glass pane is to be broken which has thicker glass panes and requires intensified arching to open the fractures, it can additionally be provided that the beams 5 as shown in FIG. 1 by the double arrows 30 are moved up and down. Preferably this movement is done to such an extent that the upper surfaces 21 of the supports 20 of the beams 5 during swivelling and during the swivelling process assume a position which is shown in FIGS. 2 and 3 by the dot-dash lines. Preferably the raising and lowering of the beams 5 is done simultaneously with their swivelling motion so that an imaginary extension of the support surfaces 21 passes through the edges 31 of the plates 1, 2 which face the beams 5.

This raising and lowering of the beams 5 is, as stated, necessary only for thicker laminated glass 3 since laminated glass 3 with conventional thickness of the two glass panes 9, 10 can be successfully broken in the device as claimed in the invention when the edges 24 of the beams 5 facing away from the axes 6 relative to their rest position which is shown in FIG. 1 are moved up (FIG. 2) and down (FIG. 3) by a few tenths of a millimeter to roughly 1 mm by swivelling the beams 5.

After the fractures in the two glass panes 9, 10 have been opened as described, the device 11 for delivering heat radiation 12 for purposes of melting the plastic film 15 between the panes 9, 10 of laminated glass 3 is activated and the film 15 is melted in the area of the fracture so that the division process is ended. To support this melting, the two support plates 1, 2 can be moved apart or only one can be moved away from the other so that the plastic film 15 is tensioned in the area of the fracture. This motion apart can also take place such that the support plates 1, 2 are swivelled around an axis which is perpendicular to their surfaces which are located in the area of one edge of the support plates 1, 2 which runs perpendicular to the dividing line, so that the laminated glass pane 3 on one end of the dividing line is pulled apart more strongly than the other (this is known in principle from U.S. Pat. No. 5,704,959).

In summary one preferred embodiment of the invention is described as follows.

A device for dividing laminated glass 3 has two supports for laminated glass 3 which has been scratched 13, 14 on both sides and in a gap 4 between them two beams 5 which are made as suction beams 5. The beams 5 can be swivelled using drives 8 around horizontal axes 6 which are parallel to the dividing line such that the laminated glass 3 is arched on the one hand up and then down. By the swivelling of the beams 5 and the associated arching of the laminated glass pane 3 the fractures in the two glass panes 9, 10 are opened along the scratch lines 13, 14 which were produced beforehand, the scratch line 13 or 14 which lies on the convex side of the arched laminated glass pane 3 being opened. To separate the plastic film 15 between the glass panes 9, 10 of the laminated glass 3 a thermal radiation source 11 is used which extends preferably over the entire width of the device and which delivers thermal radiation 12 which is preferably absorbed by the plastic film 15, but not by the glass panes 9, 10 so that the latter are not significantly heated when the plastic film melts.

What is claimed is:

1. Device for dividing scratched laminated glass comprising a plastic film between two glass planes with two support plates and a means located between the plates for arching the laminated glass in the area of the scratch lines, characterized in that the means for arching the laminated glass are two beams which are provided between the edges of the support plates that is, the edges facing one another, and the beams can be swiveled around horizontal axes independently of the support plates which are stationary when the laminated glass is broken.

2. Device as claimed in claim 1, wherein the swivel axes of the beams are located in the area of the upper edges of the beams which are adjacent to one another.

3. Device as claimed in claim 1, wherein the beams are made as suction beams.

4. Device as claimed in claim 1, wherein the beams on a side which is to adjoin the laminated glass pane bear a support of elastic material which is provided with openings which can be supplied with negative pressure.

5. Device as claimed in claim 1, wherein the beams are adjustable during the swiveling in the direction perpendicular to the support plates.

6. Device as claimed in claim 1, wherein the means for swiveling the beams are designed for common swiveling of the beams in opposite directions of swiveling.

7. Device as claimed in claim 1, wherein between the beams there is an elongated thermal radiation source which delivers thermal radiation which is preferentially absorbed by the plastic film between the glass panes of the laminated glass, but not by the glass panes of the laminated glass.

* * * * *